A. ROSENTHAL.
ROPE JOINT.
APPLICATION FILED MAY 29, 1908.
979,567.
Patented Dec. 27, 1910.
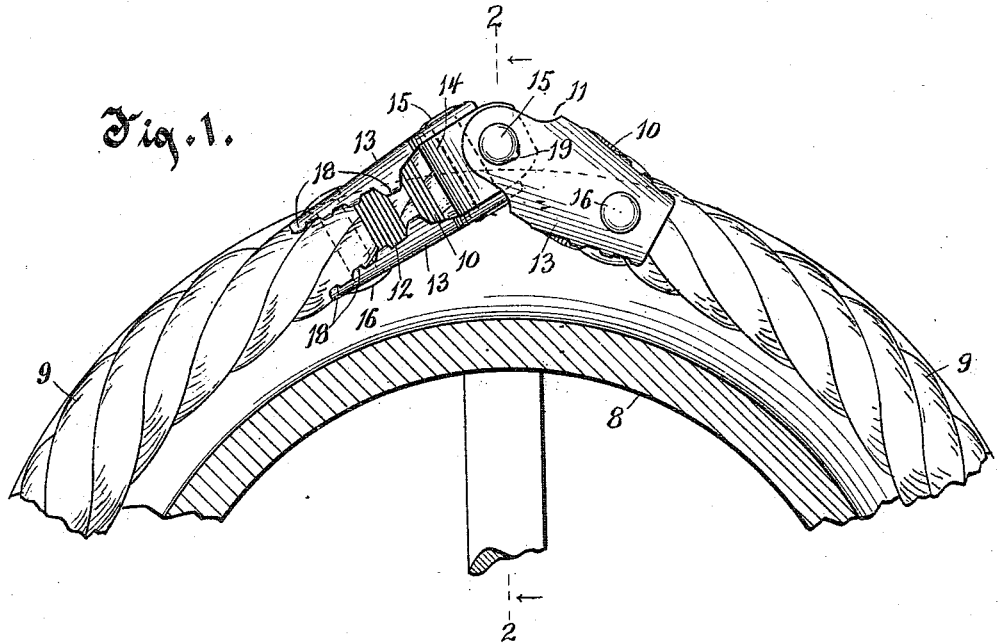
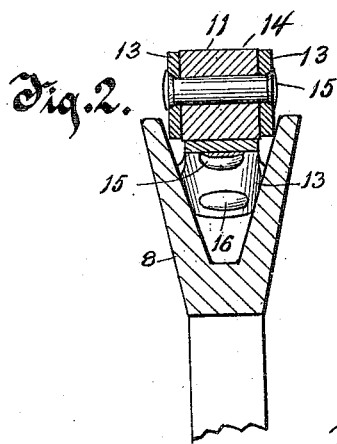
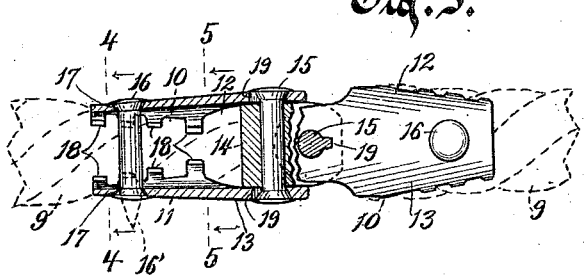
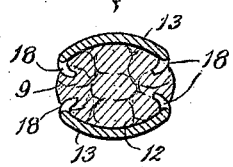
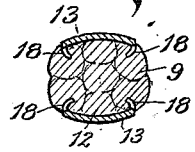
Witnesses.
C. N. Keeney.
Anna F. Schmidtbauer.
Inventor.
August Rosenthal,
By Benedict, Morsell & Caldwell
Attorneys

UNITED STATES PATENT OFFICE.

AUGUST ROSENTHAL, OF WEST ALLIS, WISCONSIN.

ROPE-JOINT.

979,567.   Specification of Letters Patent.   Patented Dec. 27, 1910.

Application filed May 29, 1908. Serial No. 435,611.

*To all whom it may concern:*

Be it known that I, AUGUST ROSENTHAL, residing in West Allis, in the county of Milwaukee and State of Wisconsin, have invented new and useful Improvements in Rope-Joints, of which the following is a description, reference being had to the accompanying drawings, which are a part of this specification.

My invention has relation to improvements in rope joints, particularly adapted, although not necessarily, for joining the ends of a power transmission rope together.

Heretofore in making rope joints of metal it has been the aim and usual custom to join the ends of the rope together by means of a universal joint connection formed of metal and of substantially the same diameter as the rope and this connection was so shaped that it would travel in the groove of a pulley in the same peripheral line as the rope itself and consequently the rope would bend at a sharp angle at the junction of the rope and the connection and cause considerable wear to the fibers of the rope and in a comparatively short time the rope would break at this point.

It is the object of this invention to overcome this serious defect in rope joints as well as to provide improved means for fastening the rope ends to the connector.

A further object of the invention is to provide means whereby the pivot pins are prevented from turning in the thin jaws of the socket portions of the joint where the wear would be considerable, but is instead transferred to the wider coupling block joining the two jaws together.

With the above, and other objects, in view, the invention consists of the devices and parts, and all equivalents, as hereinafter set forth.

In the accompanying drawing, in which the same reference characters refer to the same parts in all of the views: Figure 1 is a side view of the joint and a portion of the rope shown in the groove of a pulley, a fragment of the pulley being shown in section; Fig. 2 is a transverse sectional view of the joint and a fragment of the pulley taken on line 2—2 of Fig. 1; Fig. 3 is a side view of the joint with parts broken away and other parts in section, the rope being shown in dotted lines; Fig. 4 is a transverse sectional view of the joint and rope taken on line 4—4 of Fig. 3; and Fig. 5 is a transverse sectional view thereof taken on line 5—5 of Fig. 3.

Referring to the drawing, the numeral 8 indicates a fragment of a pulley provided with a V-shaped groove of ordinary construction. A rope 9 with its ends 10 connected together by the joint 11 is positioned within the groove of the pulley at a depth permitted by the converging walls forming the groove. The ends of the rope are wound with wire to thoroughly bind the strands together and are then inserted in the sockets 12 formed between the two-part joint or jaw members 13 which are pivotally connected to the coupling block 14 by pivot pins 15 positioned at right angles with respect to each other. Rivets 16, initially pointed, as indicated by the dotted lines 16' in Fig. 3, are driven transversely through the rope and the openings 17 provided in the two-part jaw members. The points of the rivets are then cut off and the ends are upset thus firmly binding the rope ends within the sockets and the two parts of each member together. The side edges of the two-part jaw members are provided with inwardly bent teeth or prongs 18 adapted to more securely hold the rope ends. The metal of the jaw members surrounding the pivot pin openings is notched as indicated by the numeral 19, so that in upsetting the rivet heads the metal will spread into the notches or recesses and prevent the turning of the rivets in the jaw members and confine the turning entirely between the pivot pins and the coupling block, which provides a long bearing surface. It will be noticed that the jaw members are tapered from the pivot pins to their outer ends and that the medial portion of the joint is of larger diameter than the ends thereof. The object of this tapering is to prevent the medial portion of the joint from traveling as low in the angular groove of the pulley as the outer ends of said joint and the rope connected thereto, and to cause each jaw member of the joint to assume a tangential line with respect to the circumferential line of travel of said rope thereby preventing the rope from bending at its junction with the jaw members. It is obvious that a joint of a certain size may be used with pulleys of varying diameters and width of grooves provided, that the medial portion of the joint is of larger diameter than the width of the V-shaped groove at the circumferential line of travel of the rope.

From the foregoing description it will be seen that a rope joint is provided which obviates the bending and consequent wear of the rope at its junction with the member of said joint, and that the device is very simple in construction and the wearing parts of the joint are positioned where the metal provides the greatest bearing surface.

I desire it to be understood that this invention is not limited to any specific form or arrangement of parts except insofar as such limitations are specified in the claims.

What I claim as my invention is:

1. A mechanism, comprising a pulley provided with a tapering groove, a rope, and joint members connected to the rope and pivotally connected together and provided with an enlarged portion so shaped and constructed that each member will assume a tangential line with respect to the circumferential line of travel of the connected rope while traveling in the groove of the pulley.

2. A mechanism, comprising a pulley provided with a tapering groove, a rope, and tapering joint members connected to the rope and pivotally connected together at their larger ends, the larger ends of the members engaging the pulley grooves circumferentially at a greater distance from the center than the smaller ends of said members.

3. A mechanism, comprising a pulley provided with a tapering groove, a rope, a block, and tapering joint members connected to said rope and pivotally connected to said block at their larger ends, the larger ends of the members engaging the pulley groove circumferentially at a greater distance from the center than the smaller ends of said members.

4. A mechanism, comprising a pulley provided with a tapering groove, a rope, a block, pivotal means for said block, tapering joint members connected to said rope and pivotally connected to said block at their larger ends by said pivotal means, said pivotal means positioned at right angles with respect to each other, the larger ends of the members engaging the pulley groove circumferentially at a greater distance from the center than the smaller ends of said members.

5. A mechanism, comprising a pulley provided with a tapering groove, a rope, a block, pivotal means for said block, and two part tapering joint members connected to said rope and pivotally connected to said block at their larger ends by said pivotal means, said pivotal means positioned at right angles with respect to each other, the larger ends of the members engaging the pulley groove circumferentially at a greater distance from the center than the smaller ends of said members.

6. A mechanism, comprising a pulley provided with a tapering groove, a rope, a coupling block, two part tapering joint members connected to said rope and pivotally connected to said block at their ends, and a rivet connecting the two parts of each member together and passing through the rope end positioned between the said parts, the larger portions of the joint members engaging the pulley groove circumferentially at a greater distance from the center than the smaller portions of said members.

7. A mechanism, comprising a pulley provided with a tapering groove, a rope, a block provided with openings positioned at right angles with relation to each other, two part tapering jaw members connected to said rope and provided with notched portions and openings in the jaws thereof and with rope engaging prongs or teeth on the side edges of said members, and pivot pins extending through the openings in the block and the jaws of the members and into the notches thereof, the larger portions of the joint members engaging the pulley groove circumferentially at a greater distance from the center than the smaller portions of said members.

8. A mechanism, comprising a pulley provided with a tapering groove, a rope having wired ends, a block provided with openings positioned at right angles with relation to each other, two part tapering jaw members connected to the block and provided with notched portions and openings in the jaws thereof and with rope engaging prongs or teeth on the side edges of said members, a rivet connecting the two parts of each member together and passing through the wired rope end positioned between the said parts, and pivot pins extending through the openings in the block and the jaws of the members and into the notches of said jaw openings, the larger portions of the joint members engaging the pulley groove circumferentially at a greater distance from the center than the smaller portions of said members.

9. In combination with a pulley provided with a V-shaped groove, a rope positioned in said groove, a joint connected to said rope comprising two members pivotally connected together and provided with an enlarged end portion of greater size transversely than the width of the groove at the circumferential line of travel of the rope in said groove.

10. A mechanism, comprising a pulley, a rope, and joint members connected to the rope and pivotally connected together and provided with an enlarged portion so shaped and constructed that each member will assume a tangential line with respect to the circumferential line of travel of the connected rope while traveling on the pulley.

In testimony whereof, I affix my signature, in presence of two witnesses.

AUGUST ROSENTHAL.

Witnesses:
C. H. KEENEY,
ANNA F. SCHMIDTBAUER.